United States Patent
Thantharate et al.

(10) Patent No.: US 12,089,233 B2
(45) Date of Patent: Sep. 10, 2024

(54) ADAPTIVE UE CAPABILITY INDICATORS

(71) Applicant: T-Mobile Innovations LLC, Overland Park, KS (US)

(72) Inventors: Anurag Thantharate, Kansas City, MO (US); Sreekar Marupaduga, Overland Park, KS (US); Kavitha Swaminathan, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 200 days.

(21) Appl. No.: 17/479,899

(22) Filed: Sep. 20, 2021

(65) Prior Publication Data

US 2023/0090225 A1   Mar. 23, 2023

(51) Int. Cl.
*H04W 72/51* (2023.01)
*H04W 8/24* (2009.01)
*H04W 24/10* (2009.01)
*H04W 72/542* (2023.01)

(52) U.S. Cl.
CPC ............ *H04W 72/51* (2023.01); *H04W 8/24* (2013.01); *H04W 24/10* (2013.01); *H04W 72/542* (2023.01)

(58) Field of Classification Search
None
See application file for complete search history.

(56) References Cited

U.S. PATENT DOCUMENTS

| | | | |
|---|---|---|---|
| 10,588,130 B2 | 3/2020 | Raghunathan et al. | |
| 2012/0295630 A1* | 11/2012 | Wang | H04W 8/24 455/452.1 |
| 2016/0302064 A1* | 10/2016 | Tsai | H04W 12/06 |
| 2020/0351643 A1 | 11/2020 | Dhanapal et al. | |
| 2021/0274472 A1* | 9/2021 | Foti | H04W 72/56 |
| 2022/0132320 A1* | 4/2022 | Bye | H04W 12/033 |
| 2022/0394714 A1* | 12/2022 | Agrawal | H04W 72/23 |

FOREIGN PATENT DOCUMENTS

| | | |
|---|---|---|
| EP | 3474625 A1 | 4/2019 |
| WO | 2019071377 A1 | 4/2019 |

* cited by examiner

*Primary Examiner* — Jenkey Van (57) ABSTRACT

Network circuitry within a wireless User Equipment (UE) transmits a registration request to a first Wireless Access Node (WAN) over a wireless communication link. In response, the network circuitry receives a UE capability inquiry from the first WAN and transmits it to user circuitry within the wireless UE. The user circuitry calculates Key Performance Indicator (KPI) information based on the wireless communication link, accesses UE capability information of the UE based on chipset and enabled functionality in the UE, generates intelligent UE capability information by modifying the UE capability information based on the KPI information, and transmits the intelligent UE capability information to the network circuitry. The network circuitry transmits the intelligent UE capability information to the first WAN and wirelessly exchanges data with a second WAN over a second wireless access link configured based on the intelligent UE capability information to provide wireless communication service for the wireless UE.

20 Claims, 5 Drawing Sheets

ADAPTIVE UE CAPABILITY INDICATORS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes (e.g., base stations such as eNode B, gNode B) which exchange wireless signals with the wireless user devices over radio frequency bands. The wireless signals use wireless network protocols like Fifth Generation New Radio (5GNR), Millimeter Wave (MMW), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless communication networks can be used for data as well as voice calling. The user equipment (UE) used on the wireless communication networks may be capable of using specific network protocols only. For example, older UEs may be able to use only LTE, while newer UEs may be capable of both 5GNR and LTE. As another example, the frequency bands the UE is capable of using may differ from one UE to another, or a UE may have multiple antennas to support use of more than one frequency band at a time. During attachment to the wireless communication networks and some subsequent communications, the UE provides capability information of the UE to the wireless communication network so that the wireless communication network is able to establish and continue communication with the UE using the technology that the UE is capable of using. However, the UE provides static information on its capabilities, which does not take into account the current service level or provide any intelligence regarding the UE capabilities.

Technical Overview

Network circuitry within a wireless User Equipment (UE) transmits a registration request to a first Wireless Access Node (WAN) over a wireless communication link. In response, the network circuitry receives a UE capability inquiry from the first WAN and transmits it to user circuitry within the wireless UE. The user circuitry calculates Key Performance Indicator (KPI) information based on the wireless communication link, accesses UE capability information of the UE based on chipset and enabled functionality in the UE, generates intelligent UE capability information by modifying the UE capability information based on the KPI information, and transmits the intelligent UE capability information to the network circuitry. The network circuitry transmits the intelligent UE capability information to the first WAN and wirelessly exchanges data with a second WAN over a second wireless access link configured based on the intelligent UE capability information to provide wireless communication service for the wireless UE.

DETAILED DESCRIPTION

Figure 1:
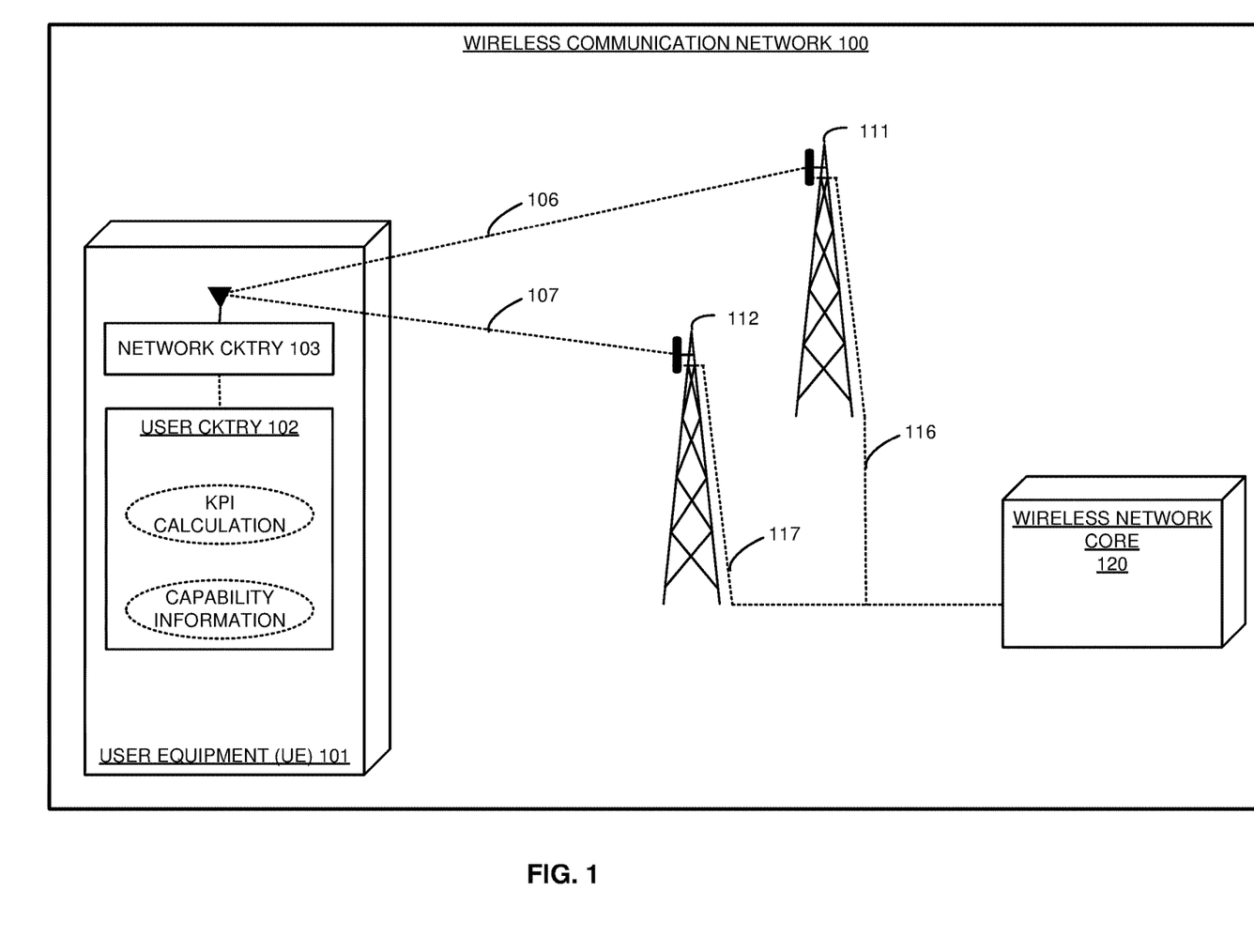
FIG. 1 illustrates a wireless communication network that serves a wireless User Equipment (UE) that intelligently provides capability information.

FIG. 1 illustrates wireless communication network 100 that serves wireless User Equipment (UE) 101. Wireless communication network 100 comprises wireless UE 101, wireless access nodes 111 and 112, and wireless network core 120. UE 101 comprises user circuitry (CKTRY) 102 and network circuitry 103. User circuitry 102 comprises capability information and Key Performance Indicator (KPI) calculation information. The number of UEs and wireless access nodes has been restricted for clarity, and wireless communication network 100 may comprise many more UEs, nodes, relays, and other equipment.

Various examples of network operation and configuration are described herein. In some examples, network circuitry 103 of UE 101 sends a request to attach to the wireless network core 120 for wireless communication service. For example, UE 101 may send such a request upon powering on. UE 101 may send the request to wireless access node 111 over wireless communication link 106. The registration request may include basic capability information. The UE 101 provides the basic capability information to the wireless access node 111 to pass to the wireless network core 120 over the backhaul link 116 so that the wireless network core 120 and wireless access node 111 may make optimal scheduling decisions for UE 101. The basic capability information may include standard UE capability information. The UE capability information includes information elements that describe the UE capabilities that the UE 101 has. The UE capability information is based on the hardware functionality of the UE 101 that is available based on, for example, the UE 101 chipset, and the software implementation which enables the various functionalities. Accordingly, if the UE 101 hardware and chipset are capable of a function, and the function is enabled by the mobile carrier in the software of the UE 101, the UE 101 declares the function as a capability, which may be included in the basic UE capability information. As an example, the basic UE capability information may include usage setting declaring whether the device is a voice centric device or a data centric device. A second information element may be a voice domain preference information element. The voice domain preference information element may allow the UE 101 to declare whether it is capable of packet switched voice (e.g., voice over 5GNR (VoNR) or voice over LTE (VoLTE)) or circuit switched voice (e.g., code division multiple access (CDMA)). A third information element may be a voice Radio Access Technology (RAT) preference to declare whether it is capable of using VoNR or VoLTE for voice. A device that declares a capability that is a newer technology (e.g., VoNR is newer technology than VoLTE) is typically deemed to also be capable of the older technology. The basic UE capability information may be identified, and user circuitry 102 may provide the basic UE capability information to network circuitry 103 for transmission with the registration request.

For 5GNR capable devices, as an example, the first information element usage setting is that the device is a voice centric device, second information element is that the device is capable of packet switched voice, and the third information element is that voice RAT preference is VoNR. This is statically available information based on the 5GNR hardware capabilities and software functionality. Once the UE capabilities are declared to the wireless network core 120, as long as the wireless access node 111 and the wireless network core 120 are capable of supporting a particular functionality, UE 101 is configured to use the functionality.

As an example, UE 101 may be a 5GNR capable device, so the above-described basic capability information is provided to wireless access node 111. Wireless access node 111 may be a 5GNR wireless access node, such as a gNodeB (gNB). Wireless access node 111 may communicate over backhaul link 116 with wireless network core 120 and provide the registration request with the basic capability information. The wireless network core 120 may include a 5GNR wireless network core 120. In some embodiments, the wireless network core 120 supports only 5GNR wireless access nodes and is therefore a standalone 5G (5G SA) network core, or in some embodiments, the wireless network core 120 supports both LTE and 5GNR and is therefore a non-standalone 5G (5G NSA) network core. In embodiments where the wireless network core 120 is a 5G SA network core, a second wireless network core (not shown) may be used for the wireless network core for LTE supported wireless access nodes (e.g., wireless access node 112). The wireless network core 120 confirms that UE 101 and its subscription support VoNR, the wireless network core 120 supports VoNR, and the wireless access node 111 supports VoNR and 5GNR capability. Wireless network core 120 provides a response to the wireless access node 111 with feature specific UE and Radio Access Network (RAN) information as well as a capability request that requests the UE capabilities in more detail. The wireless access node 111 transmits the UE capability inquiry to UE 101 over wireless communication link 106. UE 101 network circuitry 103 receives the UE capability inquiry and transmits it to user circuitry 102.

The user circuitry 102 may generate intelligent UE capability information in response to the UE capability inquiry. For example, Key Performance Indicator (KPI) calculations may be done to determine whether the basic UE capability information should be modified. The KPI calculations may be made based on the communications that have been exchanged over the wireless communication link 106 between the network circuitry 103 and the wireless access node 111. For example, KPI calculations may include calculating an average failure rate, a drop call rate, a voice quality, or a time on band KPI. Because UE 101 may have just initiated the attachment, there may be little data for the KPI calculations. However, at other times during use there are many reasons UE 101 may receive a UE capability inquiry because, for example, various triggers within the wireless network core 120 may generate a request for a UE capability update. While the initial example is for attachment, any UE capability inquiry may prompt the user circuitry 102 to calculate the KPIs based on the performance of the wireless communication link currently in use. The KPIs are calculated and used by the user circuitry 102 to determine whether the UE capability information that is currently available should be modified. For example, the UE capability information may be stored in a cache, and the user circuitry 102 may access the capability information, determine whether the UE capability information should be modified based on the KPI calculations, and make the appropriate modifications. For example, the capability information stored in the cache may indicate that the voice RAT preference is VoNR. If the KPIs indicate that the VoNR is not performing well or falls below a threshold, the user circuitry 102 may modify the UE capability information to indicate VoLTE for the voice RAT preference. The KPIs may indicate, for example, that the drop call rate falls below a threshold, the average failure rate is above a threshold, or the KPIs in some other way indicate that the coverage is poor or UE 101 is spending over a threshold amount of time on the edge of the coverage area. This poor service may occur for any reason, but particularly as 5GNR is rolled out and VoNR is implemented, the newer infrastructure may not be mature enough to consistently provide high quality of service to UE 101. The more mature older infrastructures, such as LTE and VoLTE may then be used to ensure a more robust service for customers. Accordingly, once the user circuitry 102 modifies the UE capability information, the user circuitry sends the updated UE capability information to the network circuitry 103 for transmission to the wireless access node 111. The wireless access node 111 transmits a response to the wireless network core 120 with the updated UE capability information over wireless communication link 106. The wireless network core 120 then configures the service for UE 101 based on the updated UE capability information and transmits the registration acceptance. In the above example, the wireless network core 120 may also support VoLTE, and the wireless access node 112 may be an LTE wireless access node, such as an eNodeB (eNB). The wireless access node 112 may communicate with the wireless network core 120 over backhaul link 117. Accordingly, the configuration of the support may be to transmit a handover of UE 101 to wireless access node 112 to wirelessly communicate with network circuitry 103 over wireless communication link 107 to provide the wireless access service.

As UE 101 uses the wireless access service, KPIs may be calculated based on the new wireless communication link 107. If the KPIs indicate that the service is poor or below thresholds as indicated above, the network circuitry 103 may trigger an update to the UE capability information that is transmitted to the network circuitry 103 for transmission to the wireless access node 112 over wireless communication link 107. Such modification may cause a handover back to the wireless access node 111 or some other wireless access node that is configured for, for example, VoNR to support UE 101 based on the new configuration. In some embodiments, rather than changing the voice RAT preference, other modifications may be made, such as for example a handover to a different frequency band may be done, to improve the quality of service. The KPI calculations may be performed periodically, for example, and the update may be triggered, for example, based on a KPI indicating that the coverage is poor or falls below a threshold for more than a threshold time period. In some embodiments, the wireless network core 120 may request updated UE capability information, which may trigger new KPI calculations and the UE capability information to be updated.

In another example, one of the information elements in the UE capability information may include the RAT Frequency Selection Priority (RFSP). The RFSP may indicate the preferred frequency for UE 101, for example, high band or low band frequency. The layer management strategies in the wireless network core 120 handle the frequency selection unless the RFSP is provided by UE 101 as a preference in an information element of the UE capabilities. Accordingly, in some embodiments, the UE capability information may be modified to change the RFSP value based on the KPIs. Accordingly, for example, the KPIs may indicate that the service is poor on the currently used frequency, and the user circuitry 102 may modify the RFSP to select a different frequency preference for better service. In some embodiments, the KPIs for frequency selection may be calculated using additional information such as, for example, communications on other frequency bands with various antennas in the network circuitry 103 to various wireless access nodes that support the other frequency bands to obtain information about the frequency bands that are providing the best quality of service at the given time. In some embodiments, wireless access nodes 111 and 112 may support multiple frequency bands using different antennas. Accordingly, depending on whether the voice RAT preference information element is set to VoLTE or VoNR, a different RFSP may indicate whether UE 101 should be served by wireless access node 111 (e.g., for VoNR in the above example) or 112 (e.g., for VoLTE in the above example) and the RFSP may indicate which antenna on the appropriate wireless access node 111 or 112 should be utilized to configure the wireless communication link. As the KPIs are updated based on the current communication link, the UE capability information may be updated and sent to the wireless network core 120, which may trigger handovers to other RATs or frequency bands.

Advantageously, UE 101 is able to provide intelligent UE capability information that relies not only on the hardware and software capabilities of UE 101 but also takes into consideration the performance of the network service that UE 101 is experiencing based on the configuration using the current UE capability information. Further, as the conditions change, the UE capability information can dynamically change to ensure that UE 101 continues to receive the optimal service.

UE 101 and wireless access nodes 111 and 112 wirelessly communicate over wireless links using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. As described above, for example, wireless access node 111 may be 5GNR capable, such as a gNB, and wireless access node 112 may be LTE capable, such as an eNB. The RATs use electromagnetic frequencies in the low-band, mid-band, high-band, or some other portion of the electromagnetic spectrum. Wireless access nodes 111 and 112 and wireless network core 120 communicate over backhaul links that use metallic links, glass fibers, radio channels, or some other communication media. The backhaul links use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols. While FIG. 1 depicts two wireless access nodes 111 and 112, any number of wireless access nodes 111 and 112 may be included in wireless communication network 100. The depiction of two wireless access nodes is limited for clarity.

UE 101 comprises a vehicle, sensor, robot, computer, phone, or some other data appliance with wireless communication circuitry including network circuitry 103. Wireless access nodes 111 and 112 are depicted as towers but wireless access nodes 111 and 112 may use other mounting structures or no mounting structure at all. Wireless access nodes 111 and 112 may comprise gNodeBs, eNodeBs, NB-IoT access nodes, LP-WAN base stations, wireless relays, and/or some other wireless network transceivers. UE 101 and wireless access nodes 111 and 112 comprise antennas, amplifiers, filters, modulation, and analog/digital interfaces. UE 101 and wireless access nodes 111 and 112 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
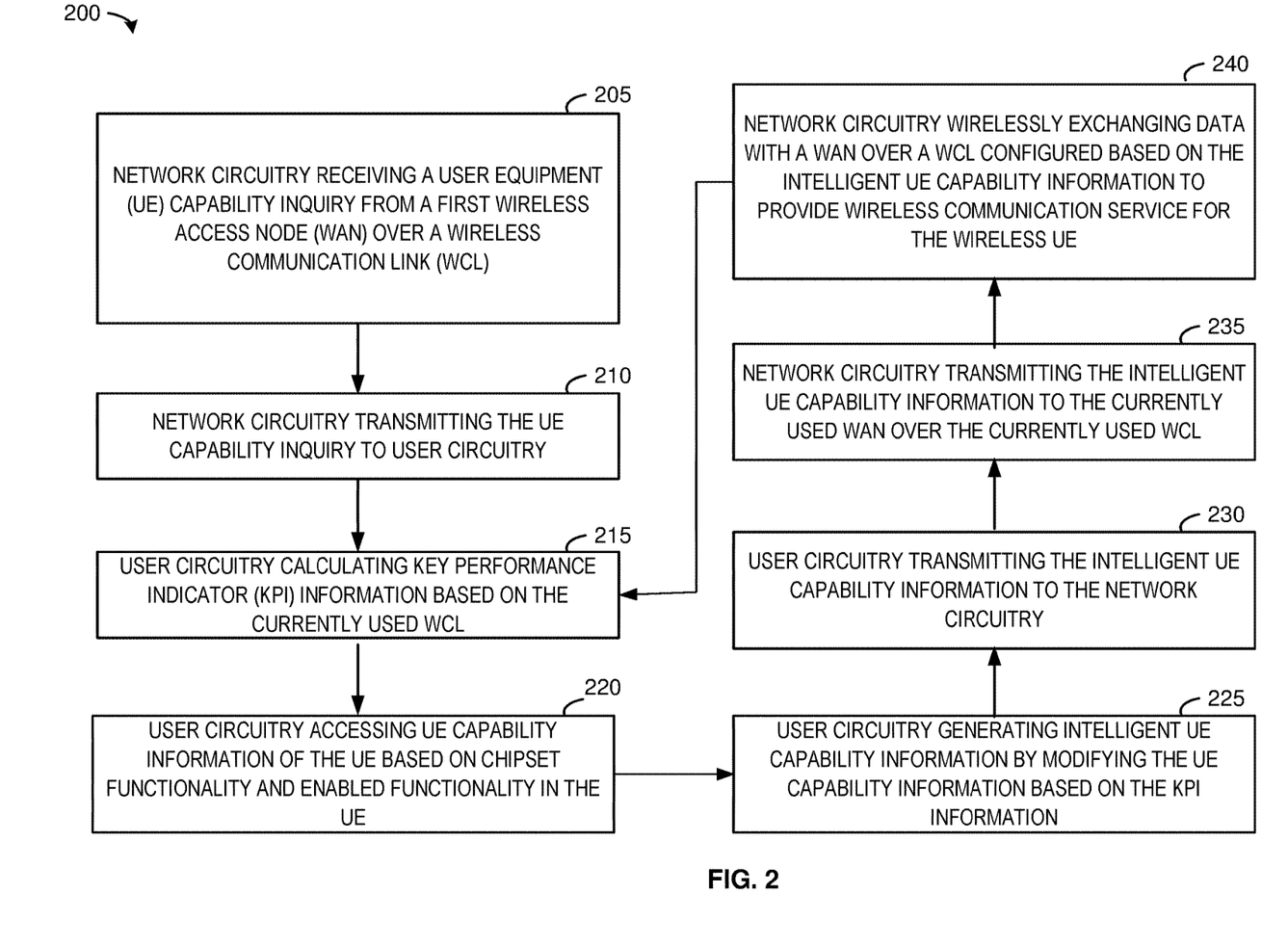
FIG. 2 illustrates the operation of the wireless UE and interaction with the wireless communication network to intelligently provide capability information.

FIG. 2 illustrates the operation 200 of a UE, such as UE 101, and the ability to provide intelligent UE capability information for obtaining optimal service from a wireless communication network, such as wireless communication network 100. At step 205, network circuitry receives a UE capability inquiry from a first wireless access node over a wireless communication link. For example, network circuitry 103 receives a UE capability inquiry from wireless access node 111 over a wireless communication link 106. The UE capability inquiry may be in response to a registration request sent by the UE or due to some activity that triggered the wireless network core (e.g., wireless network core 120) to request the UE capability information. For example, a UE handover may trigger the UE capability inquiry.

At step 210, the network circuitry transmits the UE capability inquiry to user circuitry within the UE. For example, network circuitry 103 transmits the UE capability inquiry to user circuitry 102. The network circuitry may include antennas for communicating over the wireless communication link with the wireless access node and a bus or other circuitry that allows communication between the network circuitry and the user circuitry. Upon receipt of a communication over the wireless communication link, the transmission of the communication (e.g., the UE capability inquiry) to the user circuitry may be triggered.

At step 215, the user circuitry calculates KPI information based on the currently used wireless communication link. For example, the user circuitry 102 may calculate KPI information based on the wireless communication link between the wireless access node 111 and the network circuitry 103. The KPI information may include calculating an average failure rate, a drop call rate, a voice quality, or a time on band KPI. The KPI information may be calculated periodically and/or on demand in response to the UE capability inquiry. The KPI information may be stored in a cache or in some other form of memory, in some embodiments.

At step 220, user circuitry accesses UE capability of the UE based on chipset functionality and enabled functionality in the UE. For example, the user circuitry 102 may access or determine the UE capabilities based on the capabilities of the hardware and chipset of UE 101 that are enabled by the software in UE 101. The UE capability information may include information elements as described with respect to FIG. 1. The UE capabilities may be stored in a cache or other memory of the UE. As the UE capabilities are modified, the cache or other memory of the UE may be updated. In other embodiments, each request for UE capabilities causes the user circuitry 102 to identify the software enabled functions that the UE is hardware capable of without relying on previously identified and modified versions of the UE capabilities.

At step 225, the user circuitry generates intelligent UE capability information by modifying the UE capability information based on the KPI information. For example, user circuitry 102 generates intelligent UE capability information by modifying the accessed UE capability information from step 220 based on the KPI information calculated at step 215. As discussed with respect to FIG. 1, the KPI information may indicate poor performance of the existing service that falls outside of a threshold value. In some embodiments, the poor service based on the KPI persists for a threshold time period before the user circuitry modifies the UE capability information based on the KPI information.

At step 230, the user circuitry transmits the intelligent UE capability information to the network circuitry. For example, the user circuitry 102 transmits the intelligent UE capability information generated at step 225 to the network circuitry 103.

At step 235, the network circuitry transmits the intelligent UE capability information to the currently used wireless access node over the currently used wireless communication link. For example, the network circuitry 103 transmits the intelligent UE capability information to the wireless access node 111 over the wireless communication link 106.

At step 240, the network circuitry wirelessly exchanges data with a wireless access node over a wireless communication link configured based on the intelligent UE capability information to provide wireless communication service for the wireless UE. For example, the intelligent UE capability information may indicate capabilities of VoLTE rather than VoNR. As such, the wireless network core 120 may issue a handover instruction from the wireless access node 111 to the wireless access node 112. The wireless access nodes 111 and 112 will exchange signaling with UE 101 and wireless network core 120 to complete the handover. UE 101 will then communicate with wireless access node 112 over wireless communication link 107 to receive the wireless communication service.

As either event on the wireless access node 112, UE 101, or wireless network core 120 occur, the user circuitry may calculate KPI information based on the new wireless communication link (e.g., wireless communication link 107). For example, UE 101 may periodically calculate the KPI information or may calculate the KPI information in response to a request for UE capability information. The KPI information may, for example, indicate that the UE should switch back to VoNR and/or that the UE should use a different frequency band. The appropriate information elements may be updated based on this KPI information, and new intelligent UE capability information may be generated and transmitted to the network circuitry for transmission to the wireless access node. Based on the new intelligent UE capability information, the UE may be handed over to a wireless communication link having a different frequency band and/or a different wireless access node. Accordingly, this process may continue to allow the UE to continually update the UE capability information intelligently to continue to receive optimal wireless service.

Figure 3:
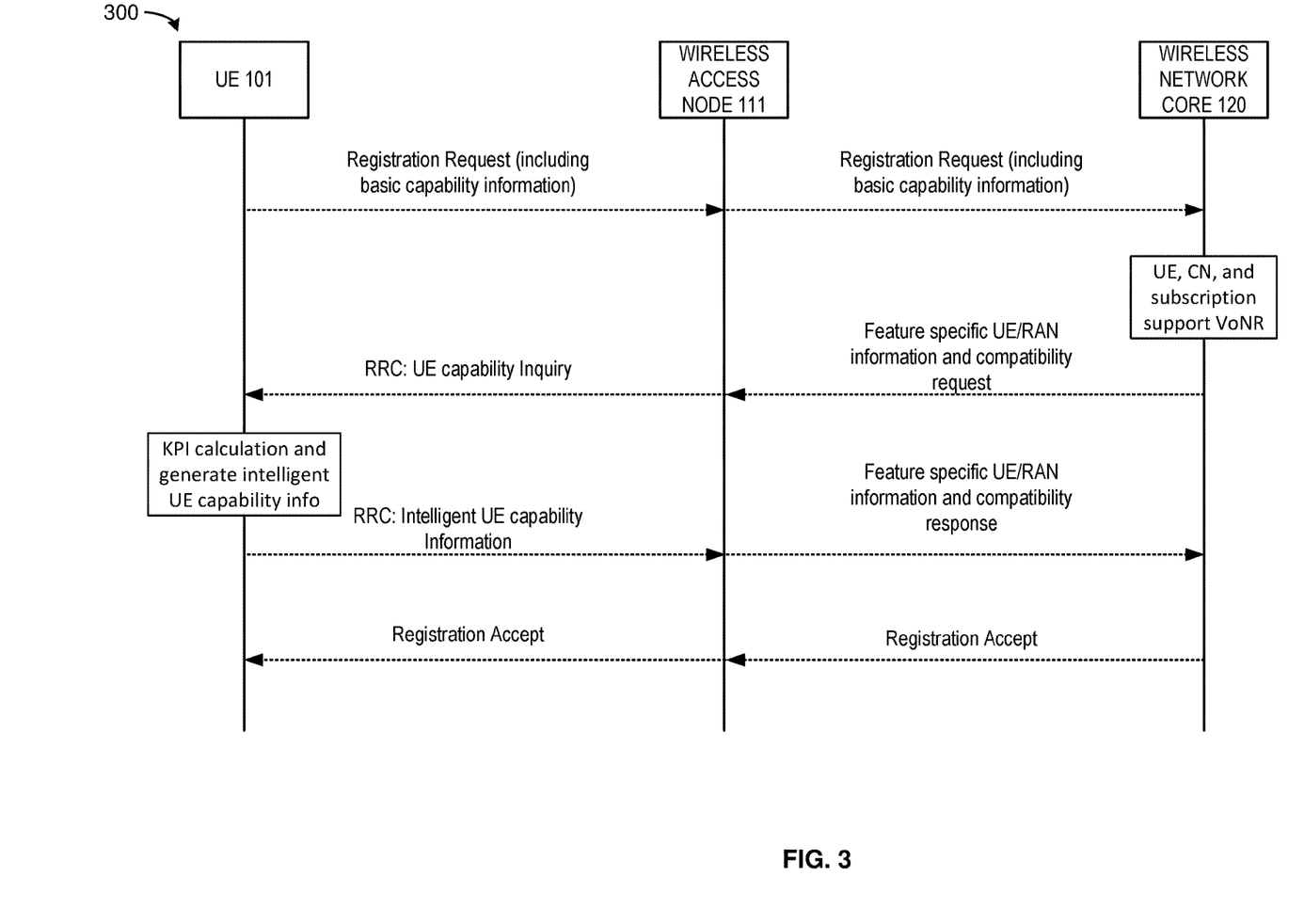
FIG. 3 illustrates a swim diagram of communication on the wireless communication network to intelligently provide wireless UE capability information.

FIG. 3 illustrates a swim diagram 300 of communication on the wireless communication network 100. UE 101, wireless access node 111, and wireless network core 120 may exchange the described signaling to negotiate and establish the UE attachment using VoNR. UE 101 is a 5G capable device. UE 101 transmits a registration request including basic capability information to the wireless access node 111, which is a 5GNR capable wireless access node. The basic UE capability information is based on UE 101 hardware capabilities and software enablement of those capabilities. In this example, the basic UE capabilities may include declaring UE 101 as a voice centric device that has a voice domain preference of packet switched networks, and a voice RAT preference of 5GNR. The wireless access node 111 transmits the registration request, including the basic capability information to the wireless network core 120, which is a 5GNR core capable of VoNR. The wireless network core 120 confirms that UE 101, the customer number (CN), and the subscription support VoNR. The wireless network core 120 supports VoNR, and the wireless access node 111 also supports VoNR. Accordingly, the wireless network core 120 transmits back feature specific UE and Radio Access Network (RAN) information and a detailed UE capability request. The wireless access node 111 transmits the UE capability inquiry to UE 101 in a Radio Resource Control (RRC) message. UE 101 receives the UE capability inquiry and performs the KPI calculations and generates the intelligent UE capability information as described above. UE 101 responds with an RRC message that includes the intelligent UE capability information. The wireless access node 111 responds with the feature specific UE and RAN information and compatibility response based on the intelligent UE capability information. For example, the intelligent UE capability information may include VoNR as the voice RAT preference, but the RFSP may be set. Alternatively, the intelligent UE capability information may include VoLTE as the voice RAT preference. As another example, the voice RAT preference may be VoLTE and the RFSP may be set. In some embodiments, the KPI calculations may not indicate an issue, and the intelligent UE capabilities may remain unchanged. For example, the voice RAT preference may remain VoNR. The information transmitted to the wireless network core 120 may be used to accept the registration based on the wireless network core 120 having the ability to support UE 101 based on the preferences. Should the wireless network core 120 not support, for example, VoNR, VoLTE may be established instead. Accordingly, the registration accept is transmitted to the wireless access node 111, and the wireless access node 111 transmits the registration acceptance to UE 101. Once registered, a handover may occur to establish a communication link with a wireless access node that supports the intelligent UE capabilities that were provided. For example, a handover to a wireless access node supporting a different frequency or a different voice RAT preference may occur based on the intelligent UE capabilities.

Figure 4:
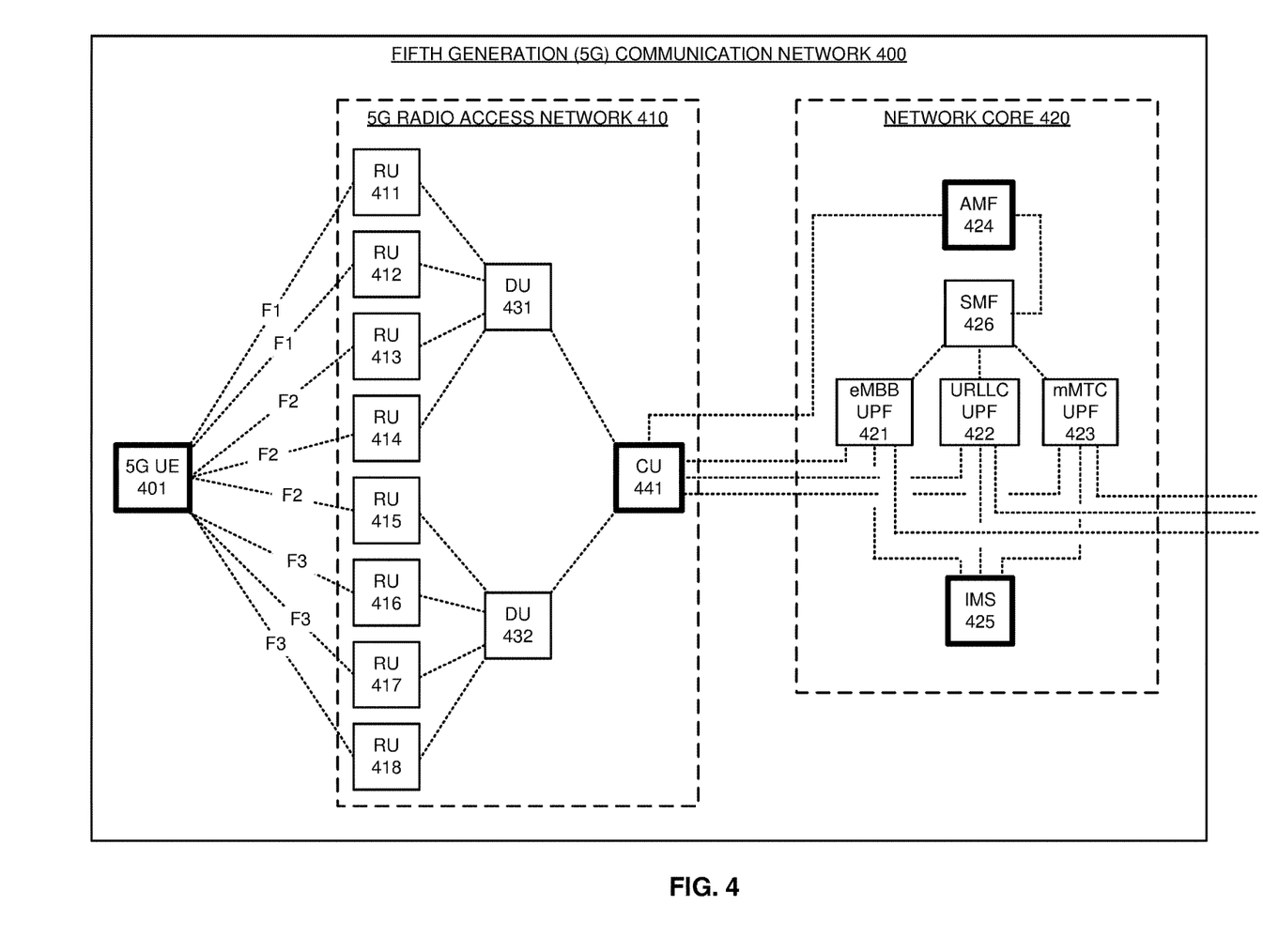
FIG. 4 illustrates a Fifth Generation (5G) communication network that serves a 5G User Equipment (UE).

FIG. 4 illustrates Fifth Generation (5G) communication network 400 that serves 5G User Equipment (UE) 401 that intelligently provides UE capability information. 5G communication network 400 comprises an example of wireless communication network 100, although network 100 may differ. 5G communication network 400 comprises 5G UE 401, 5G Radio Access Network (RAN) 410, and 5G network core 420. 5G RAN 410 comprises Radio Units (RUs) 411-418, Distributed Units 431 and 432, and Centralized Unit (CU) 441. 5G network core 420 comprises eMBB User Plane Function (UPF) 421, URLLC UPF 422, mMTC UPF 423, Access and Mobility Management Function (AMF) 424, Internet Protocol (IP) Multimedia Subsystem (IMS) 425, and Session Management Function (SMF) 426. Other network functions are typically present but are omitted for clarity. RUs 411 and 412 use a first frequency band (F1) that may be a few thousand megahertz wide. RUs 413-415 use a second frequency band (F2) that may be several hundred megahertz wide. RUs 416-418 use a third frequency band (F3) that may be a few hundred megahertz wide. While a 5G implementation is shown, network core 420 may additionally support LTE devices, wireless access nodes, VoLTE, and LTE data.

In some embodiments, to attach to the wireless communication network 400, UE 401 wirelessly attaches to RU 411 over F1 and exchanges attachment signaling with CU 441 over RU 411. For data purposes, UE 401 transmits requests for frequency bands and slices to AMF 424 over RU 411, DU 431, and CU 441. AMF 424 authorizes the frequency bands and slices as appropriate to establish a data connection with slices including establishing at least one of the enhanced Mobile BroadBand (eMBB) User Plane Function (UPF) 421, Ultra Reliable Low Latency Communications (URLLC) UPF 422, and massive Machine Type communication (mMTC) UPF 423. For voice purposes, the registration request UE 401 transmits includes basic UE capability information as described above. RU 411 transmits the registration request to the AMF 424 via DU 431 and CU 441. The AMF 424 confirms the UE 401, customer number, and subscription information to support VoNR. The AMF 424 sends back an N2 message via CU 441 and DU 431 to RU 411 that requests feature specific UE and RAN information to initiate a UE capability inquiry. The RU 411 transmits the UE capability inquiry to UE 401. UE 401 generates the KPI information based on the F1 link and generates intelligent UE capability information as described above based on the KPI information. UE 401 transmits the intelligent UE capability information to AMF 424 via RU 411, Du 431, and CU 441. AMF 424 uses the UE capability information to determine that the registration be accepted and transmit an acceptance to UE 401 via CU 441, DU 431, and RU 411. AMF 424 then establishes a voice communication using the appropriate UPF (e.g., URLLC UPF 422) using IMS 425 and connecting through the appropriate RU (e.g., RU 414) and DU (e.g., DU 431). UE 401 then has voice capability using IMS 425 based on the intelligent UE capability information. For example, despite being a 5G capable device, UE 401 may indicate that the IMS services for voice use LTE rather than 5GNR. As another example, the intelligent UE capability information may indicate to use F2 rather than F1 or F3, such that the IMS services route through RU 413, 314, or 415, for example.

Figure 5:
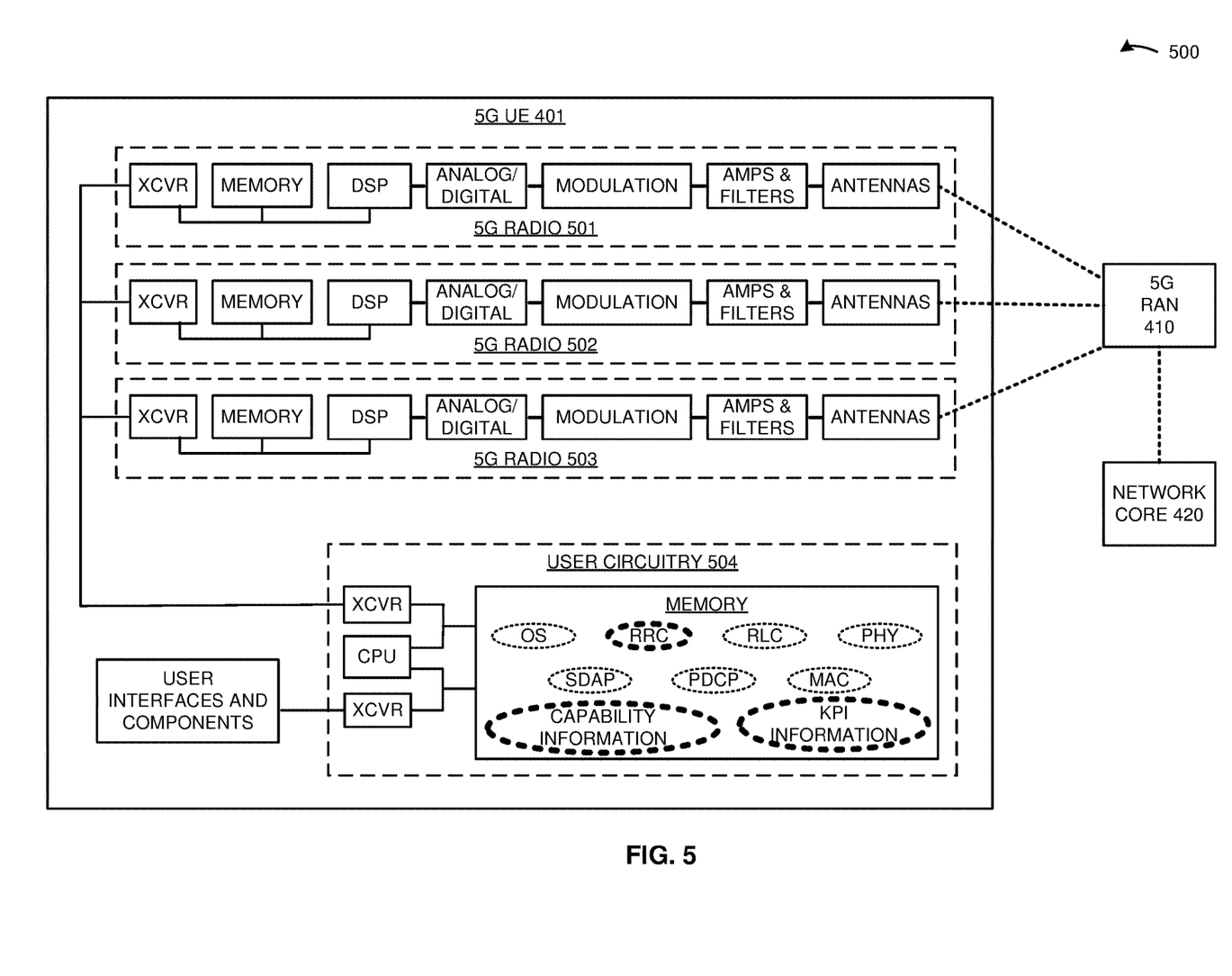
FIG. 5 illustrates the 5G UE that intelligently provides capability information.

FIG. 5 illustrates 5G UE 401 that intelligently provides UE capability information. UE 401 comprises an example of UE 101, although UE 101 may differ. UE 401 comprises 5GNR radios 501-503 and user circuitry 504. 5GNR radios 501-503 comprise antennas, amplifiers, filters, modulation, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system, UE capability information (CAPABILITY INFORMATION), KPI INFORMATION, and 5GNR network applications for PHY, MAC, RLC, PDCP, SDAP, and RRC. The antennas in 5GNR radios 501-503 are wirelessly coupled to 5G RAN 410 over Operating Frequency Bands (OFBs) F1-F3. Transceivers in 5GNR radios 501-503 are coupled to a transceiver in user circuitry 504. A transceiver in user circuitry 504 is typically coupled to the user interfaces and components like displays, controllers, and memory. The CPU in user circuitry 504 executes the operating system, PHY, MAC, RLC, PDCP, SDAP, and RRC to exchange 5GNR signaling and data with 5G RAN 410 over 5GNR radios 501-503.

In 5GNR radios 501-503, the antennas receive wireless signals from 5G RAN 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency (F1-F3). The analog/digital interfaces convert the demodulated analog signals into digital signals for the DSPs. The DSPs transfer corresponding 5GNR symbols to user circuitry 504 over the transceivers. In user circuitry 504, the CPU executes network applications to process the 5GNR symbols and recover the downlink 5GNR signaling and data. The CPU executes user applications to identify the capability information and generate the KPI information. Based on the applications, the capability information is modified based on the KPI information as described above. Other user applications are also executed that generate data. The 5GNR network applications receive new uplink signaling and data from the user applications, including the UE capability information generated based on the identified capability information and the KPI information. The network applications process the uplink user signaling, the downlink 5GNR signaling to generate new downlink user signaling, and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data. In 5GNR radios 501-503, the DSPs process the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency (F1-F3). The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 410 that transport the uplink 5GNR signaling and data.

RRC functions comprise authentication, security, handover control, status reporting, QoS, network broadcasts and pages, and network selection. SDAP functions comprise Qos marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

The wireless data network circuitry described above comprises computer hardware and software that form special-purpose UE circuitry to generate intelligent UE capability information. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically embedded machine-level software that drives the compilation and execution of the other computer software components which then assert control. Due to this automated execution, the presence of the higher-level software in memory physically changes the structure of the computer hardware machines into special-purpose UE circuitry to use specific handover types for specific wireless network slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless User Equipment (UE) to intelligently provide UE capability information, the method comprising:
   network circuitry receiving a UE capability inquiry from a first wireless access node over a wireless communication link;
   the network circuitry transmitting the UE capability inquiry to user circuitry;
   in response to the UE capability inquiry, the user circuitry calculating Key Performance Indicators (KPIs) that indicate performance of a first frequency band of the wireless communication link;
   the user circuitry accessing UE capability information of the UE based on chipset functionality and enabled functionality in the UE wherein the UE capability information comprises a Radio Access Technology (RAT) Frequency Selection Priority (RFSP) information element that selects a first frequency band preference;
   the user circuitry comparing the KPIs to performance thresholds for the first frequency band to determine when to modify the RFSP element;
   when one or more of the KPIs trigger a corresponding performance threshold of the performance thresholds, the user circuitry generating intelligent UE capability information by modifying the RFSP information element to select a second frequency band preference based on the KPIs;
   the user circuitry transmitting the intelligent UE capability information to the network circuitry;
   the network circuitry transmitting the intelligent UE capability information to the first wireless access node over the wireless communication link in response to the UE capability inquiry; and
   the network circuitry wirelessly exchanging data with a second wireless access node over a second wireless communication link configured based on the intelligent UE capability information to provide wireless communication service for the wireless UE.

2. The method of claim 1, wherein the UE capability information comprises a voice Radio Access Technology (RAT) preference information element selecting a first voice RAT preference, the KPIs comprise a KPI indicating poor connectivity over the first RAT preference, and generating the intelligent UE capability information comprises modifying the voice RAT preference information element to select a second RAT preference.

3. The method of claim 2, wherein the first RAT preference is Fifth Generation New Radio (5GNR) RAT, and the second RAT preference is Long Term Evolution (LTE) RAT.

4. The method of claim 1, wherein the first frequency band is associated with a first Radio Unit (RU) of a Radio Access Network (RAN) and the second frequency band is associated with a second RU of the RAN.

5. The method of claim 1, wherein the KPIs comprise at least one of average failure rate, drop call rate, voice quality, or time on band.

6. The method of claim 1, further comprising:
   the user circuitry updating the KPIs based on the second wireless communication link, generating updated intelligent UE capability information, and transmitting the updated UE capability information to the network circuitry;
   the network circuitry transmitting the updated UE capability information to the second wireless access node; and
   the network circuitry wirelessly exchanging data with a third wireless access node over a third wireless communication link configured based on the updated intelligent UE capability information to provide the wireless communication service for the wireless UE.

7. The method of claim 6, wherein the user circuitry updates the KPIs, generates the updated intelligent UE capability information, and transmits the updated UE capability information in response to a Radio Resource Control (RRC) reconfiguration.

8. The method of claim 6, wherein the user circuitry updates the KPIs, generates the updated intelligent UE capability information, and transmits the updated UE capability information in response to a determination that the wireless UE is receiving a quality of service below a threshold quality of service for a time period exceeding a threshold time period.

9. The method of claim 1, further comprising:
   the user circuitry storing the KPIs in a cache.

10. The method of claim 1, further comprising:
    the user circuitry calculating additional KPIs based on multiple wireless communication links, wherein generating the intelligent UE capability information is based further on the additional KPIs.

11. A wireless User Equipment (UE) that intelligently provides UE capability information, the wireless UE comprising:
   network circuitry configured to receive a UE capability inquiry from a first wireless access node over a wireless communication link;
   the network circuitry configured to transmit the UE capability inquiry to user circuitry;
   in response to the UE capability inquiry, the user circuitry configured to calculate Key Performance Indicators (KPIs) that indicate performance of a first frequency band of the wireless communication link;
   the user circuitry configured to access UE capability information of the UE based on chipset functionality and enabled functionality in the UE wherein the UE capability information comprises a Radio Access Technology (RAT) Frequency Selection Priority (RFSP) information element that selects a first frequency band preference;
   the user circuitry configured to compare the KPIs to performance thresholds for the first frequency band to determine when to modify the RFSP element;
   when one or more of the KPIs trigger a corresponding performance threshold of the performance thresholds, the user circuitry configured to generate intelligent UE capability information by modifying the RFSP information element to select a second frequency band preference based on the KPIs;
   the user circuitry configured to transmit the intelligent UE capability information to the network circuitry;
   the network circuitry configured to transmit the intelligent UE capability information to the first wireless access node over the wireless communication link in response to the UE capability inquiry; and
   the network circuitry configured to wirelessly exchange data with a second wireless access node over a second wireless communication link configured based on the intelligent UE capability information to provide wireless communication service for the wireless UE.

12. The wireless UE of claim 11, wherein the UE capability information comprises a voice Radio Access Technology (RAT) preference information element selecting a Fifth Generation New Radio (5GNR) RAT voice RAT preference, the KPIs comprise a KPI indicating poor connectivity over the 5GNR RAT preference, and generating the intelligent UE capability information comprises the user circuitry configured to modify the voice RAT preference information element to select a Long Term Evolution (LTE) RAT preference.

13. The wireless UE of claim 11, wherein the first frequency band is associated with a first Radio Unit (RU) of a Radio Access Network (RAN) and the second frequency band is associated with a second RU of the RAN.

14. The wireless UE of claim 11, wherein the KPIs comprise at least one of average failure rate, drop call rate, voice quality, or time on band.

15. The wireless UE of claim 11, further comprising:
   the user circuitry configured to update the KPIs based on the second wireless communication link, generate updated intelligent UE capability information, and transmit the updated UE capability information to the network circuitry;
   the network circuitry configured to transmit the updated UE capability information to the second wireless access node; and
   the network circuitry configured to wirelessly exchange data with a third wireless access node over a third wireless communication link configured based on the updated intelligent UE capability information to provide the wireless communication service for the wireless UE.

16. The wireless UE of claim 15, wherein the user circuitry is configured to update the KPIs, generate the updated intelligent UE capability information, and transmit the updated UE capability information in response to a Radio Resource Control (RRC) reconfiguration.

17. The wireless UE of claim 15, wherein the user circuitry is configured to update the KPIs, generate the updated intelligent UE capability information, and transmit the updated UE capability information in response to a determination that the wireless UE is receiving a quality of service below a threshold quality of service for a time period exceeding a threshold time period.

18. The wireless UE of claim 11, further comprising:
   the user circuitry configured to store the KPIs in a cache.

19. The wireless UE of claim 11, further comprising:
   the user circuitry configured to calculate additional KPIs based on multiple wireless communication links, wherein generating the intelligent UE capability information is based further on the additional KPIs.

20. A wireless communication network that intelligently provides UE capability information, the wireless communication network comprising:
   a wireless User Equipment (UE) configured to establish a wireless communication link with a first wireless access node and wirelessly transfer a registration request that includes basic UE capability information to a wireless network core over the first wireless access node;
   the wireless network core configured to receive the registration request and in response, generate a UE capability inquiry and transfer the UE capability inquiry to the wireless UE;
   the wireless UE configured to wirelessly receive the UE capability inquiry from the first wireless access node over the wireless communication link and calculate average failure rate, drop call rate, voice quality, and time on band for previous communications over the wireless communication link to generate Key Performance Indicator (KPIs) that indicate performance of a first frequency band of the wireless communication link in response to the UE capability inquiry;
   the wireless UE configured to access UE capability information that comprises a Radio Access Technology (RAT) Frequency Selection Priority (RFSP) information element that selects a first frequency band preference, compare the KPIs to performance thresholds for the first frequency band to determine when to modify the RFSP element, and when one or more of the KPIs trigger a corresponding performance threshold of the performance thresholds, modify the RFSP information element to select a second frequency band preference based on the KPIs to generate intelligent UE capability information, and transmit the intelligent UE capability information to the wireless network core over the first wireless access node;
   the wireless network core configured receive the intelligent UE capability information, register the wireless UE, and transfer a registration accept message to the wireless UE over the first wireless access node; and
   the wireless UE configured to wirelessly receive the registration accept message and hand over to a second wireless access node that provides the second frequency band based on the intelligent UE capability information.

\* \* \* \* \*